Figure 1:
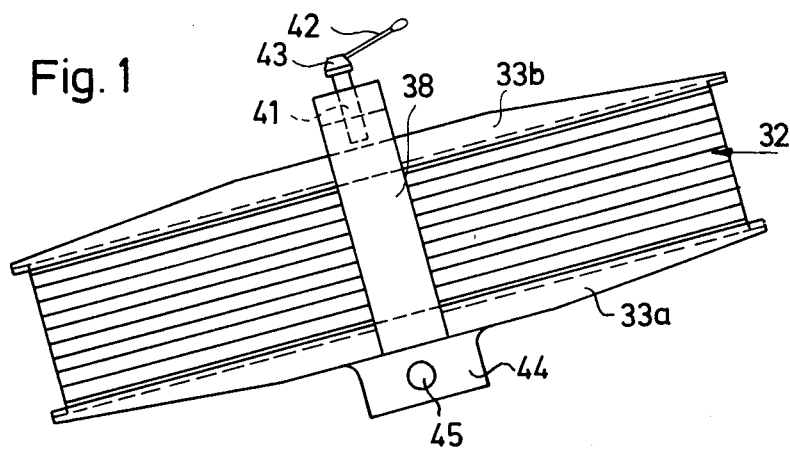

United States Patent [19]
Johansson

[11] 3,920,555
[45] Nov. 18, 1975

[54] DEVICE FOR DIALYSIS APPARATUS WHERE A NUMBER OF ELEMENTS ARE POSITIONED IN A STACK

[76] Inventor: Paul-Johny Johansson, Bankgatan 14, S-223 52 Lund, Sweden

[22] Filed: Dec. 10, 1973

[21] Appl. No.: 423,394

[30] Foreign Application Priority Data
Sept. 13, 1973  Sweden.............................. 7312462

[52] U.S. Cl. ................................................ 210/321
[51] Int. Cl.² ................... B01D 31/00; B01D 13/00
[58] Field of Search............................... 210/22, 321

[56] References Cited
UNITED STATES PATENTS

| | | | |
|---|---|---|---|
| 2,799,644 | 7/1957 | Kollsman ...................... | 210/321 X |
| 3,397,141 | 8/1968 | Hakai............................. | 210/321 X |
| 3,534,860 | 10/1970 | Dibelius et al...................... | 210/321 |
| 3,540,595 | 12/1967 | Edwards ............................ | 210/321 |

Primary Examiner—Frank A. Spear, Jr.
Attorney, Agent, or Firm—John J. Dennemeyer

[57] ABSTRACT

A dialysis apparatus comprises first plates for the passage of blood and second plates for the passage of a purification liquid and permeable diaphragms disposed between the first and second plates, the first and second plates including inlet and outlet holes and passage means for the blood and the purification liquid, respectively.

7 Claims, 11 Drawing Figures

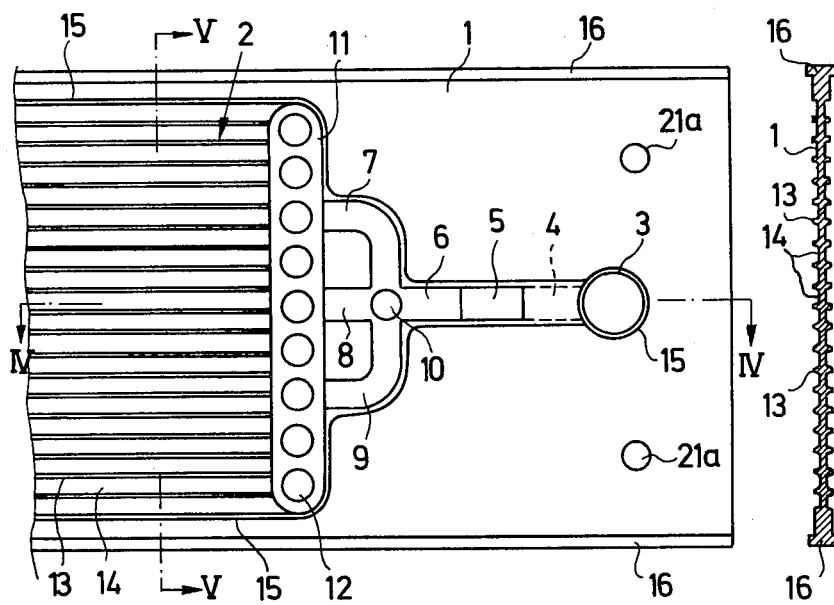
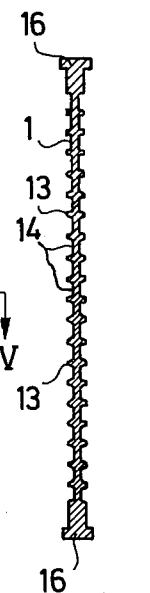
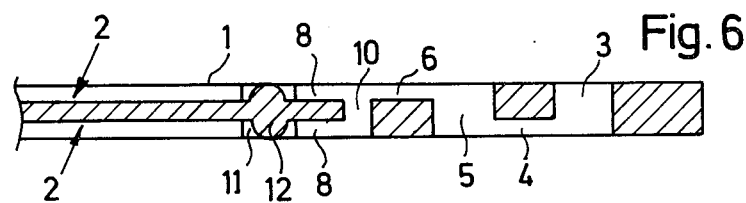
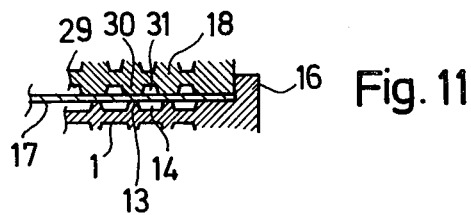

DEVICE FOR DIALYSIS APPARATUS WHERE A NUMBER OF ELEMENTS ARE POSITIONED IN A STACK

The present invention relates to a device for dialysis apparatus where a number of elements are positioned in a stack and pushed in a direction towards each other and where either two diaphragms are provided between the sides of the elements directed towards each other to define a flow space between the inner sides of the diaphragms for a medium to be purified, preferably blood, and two flow spaces between adjacent sides of the elements and the outer sides of the diaphragms for a purification medium, preferable a purification liquid, or one diaphragm is provided between the sides of the elements directed towards each other to define a flow space between one side of the diaphragm and the adjacent side of the element for a medium to be purified, preferably blood, and to define a flow space between the other side of the diaphragm and adjacent side of the element for a purification medium, preferably a purification liquid, whereby feeding and discharge of the medium to be purified is accomplished by at least one row of holes formed in the two end portions of the elements and whereby feeding and discharge of the purification medium is accomplished by means of at least a second row of holes formed in the two end portions of the elements.

In dialysis apparatus of the type mentioned it is necessary to distribute the blood and the purification liquid in such a manner that all the parts of the flow spaces are receiving streams in order to obtain a high degree of purification. Furthermore, it is desirable to feed the blood and the purification liquid so that the flow is equal in the different parts of the spaces.

In order to accomplish this, separate distributor means are used which project into recesses around feeding holes in the respective elements. Each distributor means has a series of radially directed through passes, intended to distribute the blood and the purification liquid, respectively, into branch-rich passage systems and via these provide a uniform or even distribution into the flow spaces.

These distributor means have resulted in a satisfactory distributing action. There is, however, a risk that said distributor means be mis-assembled or displaced from their preselected positions. A risk for mis-assemblage exists especially when the dialysis apparatus is to be assembled by a patient in dialysis treatment outside the hospital, such as in the home of the patient. Such a treatment is presently employed, and its use is likely to increase substantially in the future.

In known distributor means, transition pockets are formed between the passages and the channels in the passage system. Parts of these pockets are located outside the blood stream, and streaming blood has a tendency to coagulate in these parts. As a result thereof, certain passages of the passage system may be clogged, leading to an uneven blood distribution and a less efficient purification effect. The principle to accomplish the distribution by means of separate distributor means and a branch-rich passage system also means that a relatively high flow resistance is met. The natural blood pressure is often too low to permit the necessary flow, however, and in these cases the blood pressure must be increased by aid of a pump assembly.

The object of the present invention is to eliminate these drawbacks and provide a dialysis apparatus where separate distributor means are eliminated and consequently the risk to mount such means incorrectly is avoided. Furthermore, in the dialysis apparatus according to the invention the risk for blood coagulation in transition areas is eliminated and the risk for clogging of narrow distributing passages is reduced.

Figure 2:
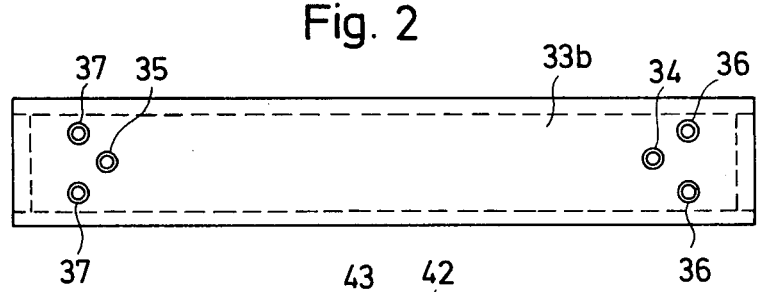
Figure 3:
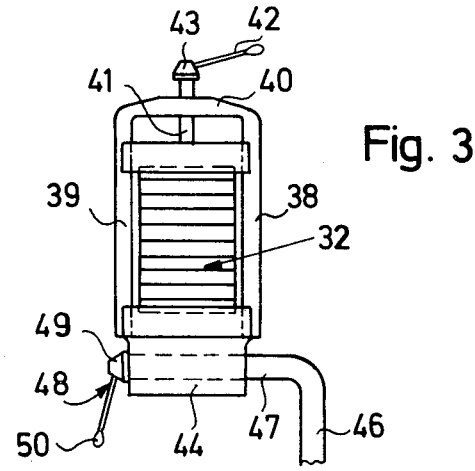
Figure 7:
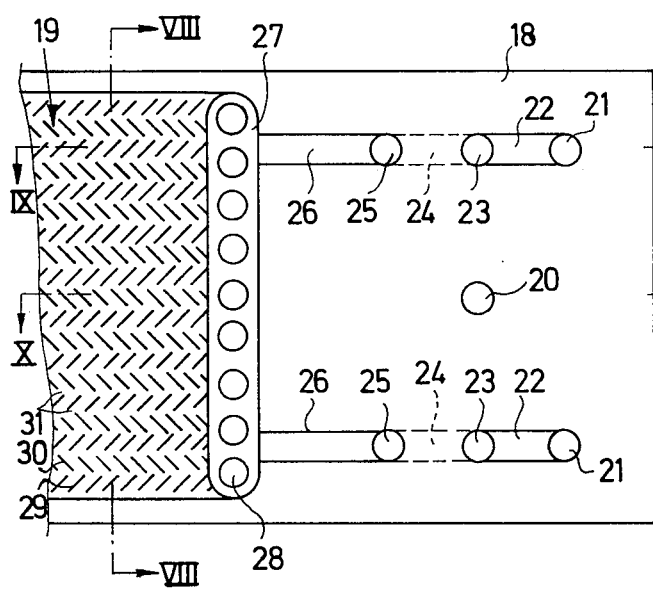
Figure 8:
Figure 9:
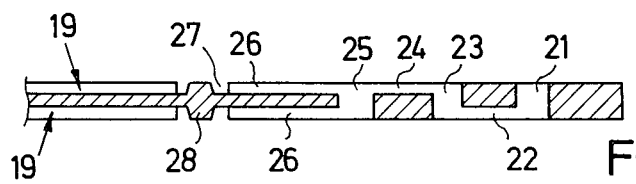
Figure 10:
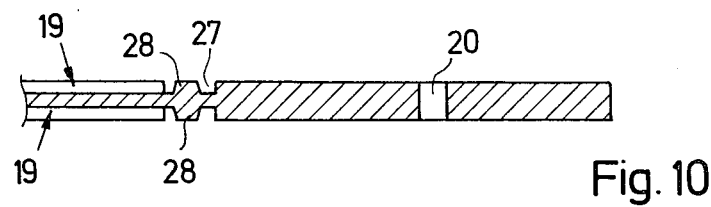

The invention will be further explained with reference to the accompanying drawings, where:

FIG. 1 is a side view illustrating the assembled dialysis apparatus according to the invention, FIG. 2 is a planar view of a clamp plate in the dialysis apparatus, FIG. 3 is a front view of the dialysis apparatus provided on a carrier arm, FIG. 4 is a planar view illustrating a plate for blood in the dialysis apparatus, FIG. 5 is a section V — V in FIG. 4, FIG. 6 is a section VI — VI in FIG. 4, FIG. 7 is a planar view illustrating a plate for the purification medium in the dialysis apparatus, FIG. 8 is a section VIII — VIII in FIG. 7, FIG. 9 is a section IX — IX in FIG. 7, FIG. 10 is a section X — X in FIG. 7, and FIG. 11 is a sectional view through a part of a blood plate placed in position in relation to a plate for the purification medium and a diaphragm located between the plates.

The invention is to be used either in dialysis apparatus in which the blood is caused to flow through a flow space between two diaphragms and the purification liquid is caused to flow outside said diaphragms, or in dialysis apparatus where the blood is caused to flow through a flow space having the shape of a passage system in a blood plate on one side of a diaphragm and the purification liquid is caused to flow through a flow space having the shape of a passage system in a plate for the purification liquid on the other side of said diaphragm. The use of the dialysis apparatus of the latter-mentioned kind is described in the following.

Each blood plate 1 has an inlet hole 3 for blood in an end portion and an outlet hole for blood (not shown) in the opposite end portion, and each plate 18 has an aperature 20 for blood in both end portions thereof. Further, each plate 18 for a purification liquid has two inlet holes 21 in one end portion and two outlet holes for purification liquid (not shown) in the other end portion, whereby each blood plate 1 has two aperatures 21a for purification liquid in each end portion. Holes 3 and 20 for blood are so located that they will be centered and define a row of holes when the plates are mounted; similarly, holes 21 and 21a for a purification liquid will be centered and define rows of holes when the mounting is completed. Said rows of holes will be centered with inlet and outlet holes 34 – 37 in the clamp plate 33b and to and from lines (not shown) for blood and the purification liquid are connected thereto.

Plates 1 and 18, with diaphragm 17 placed between them, are arranged in a stack 32, which is inserted between clamp plates 33a, 33b in a frame 38, 39, 40, which, by means of a bracket 44 provided with holes 45, is mounted on an arm 46, 47. The package 32 is compressed and kept compressed by means of a clamping device 41–42, 43 on the frame, and the bracket 44 is held clamped in the desired position on the arm 46, 47 by the aid of a clamping device 48, 49, 50. After assemblage of the stack 32, holes are made in the diaphragm 17 by means of a tool of suitable kind that is inserted through the holes 34, 35, 37.

According to the present invention the feeding of blood and purification liquid from the inlet holes 3, 21 to the passage systems 2, 19 may be accomplished without intermediately connected distributing means. For this object a passage branch 4 projects from the inlet hole 3 of the blood plate 1 and this passage branch 4 comprises a recess in one side of the blood plate 1. The passage branch 4 opens into a passage branch 5, which is designed as an aperature in the plate 1. A passage branch 6 extends from the passage branch 5, which comprises a recess in the other side of the plate 1, and said passage branch 6 opens onto a flow distributing hole 10 extending transversely through the plate 1. Three passages 7, 8 and 9 extend from the flow distributing hole 10, and comprise recesses in both sides of the plate 1, and one or more, preferably two, of these passage branches 7, 8, 9 may be provided with pressure equilizing holes (not shown). The passage branches 7, 8, 9 open into distributing passages 11, comprising recesses, extending transversely to the longitudinal direction of the plate. A series of distributors 12 lying beside each other are provided in the distributing passages 11; said distributors have circular or elliptical shape and distribute the blood to flow into the passages 14 of the passage system 2. The other end portion of the blood plate 1 is provided with a corresponding passage structure, but, this is reversed and opens into an outlet hole for blood. The disclosed embodiment results in that a favorable blood distribution is obtained in a simple manner and without any separately mountable details.

In order to obtain a very reliable seal between the plates 1, 18 and the diaphragms 17 lying between them, the blood plate 1 has an outwardly directed sealing flange 15 on one or both sides. Said sealing flange 15 surrounds the inlet hole 3, both outer sides of the passage branches 4, 5, 6, 7 and 9, the outer side of the distribution passage 11 and the passage system 2, and in a corresponding manner on the other end portion of the plate. The present sealing flange 15 is suitably dimensioned to yield to some extent upon squeezing of the package 32.

A passage branch 22 extends from the two inlet holes 21 of the plate 18 and is designed as a recess in one side of the plate 18. This passage branch 22 opens into an opening 23 running through the plate 18 and a passage branch 24 shaped as a recess in the other side of the plate 18 extends from this opening. This passage branch opens into a pressure equilizing hole 25, which extends through the plate. Passage branches 26 project from the pressure equilizing hole 25 on both sides of the plate. The passage branches 26 open into a distributing passage 27 comprising a recess extending transversely to the longitudinal direction of the plate 18. A series of distributors 28 are placed side by side in this recess and shaped as circular or elliptical bosses. The distributing passage 27 and the distributors 28 distribute the purification liquid across the width of the passage system 19 and this is accomplished with the required effect without the need for separately mountable distributing details. The other end portion of the plate 18 is provided with a similar system of passage branches and distributing passages, which are reversely directed and open in outlet holes for the purification liquid.

The disclosed embodiment results in that the blood and purification liquid are caused to flow substantially undistributed, or distributed into a few streams, from inlet holes 3, 21, respectively, to distributing passage 11, 27, respectively, and the distributing over the width of the passage systems 2, 19 is first obtained in this distributing passage 11, 27.

In order to permit mounting of the plates 1, 18 in exact positions relative to each other, one type of the plates may be provided on at least one end portion with at least one guiding heel (not shown) and the second type of plates may be provided with a recess corresponding to the guiding heel. The guiding heels are suitably located so that the distributing passage 11 of the blood plate 1 after the mounting will be located opposite the distributing passage 27 of the plate 18.

According to the invention, the inlet and outlet holes 3 and 21 in the end portion of plates 1 and 18 respectively are located in flat parts, which define the engaging surfaces of the end portions. The edges of the holes project straight out from these planes, which means that the formation of pockets or the like between the holes and the passage branches extending therefrom is prevented.

The disclosed embodiment may be varied within the scope of the following claims.

Furthermore, the sealing flange 15 may be located to surround only the blood inlet hole on one or both sides of the blood plate 1. A recess (not shown) corresponding to the sealing flange 15 may be provided in the plate 18 if so desired.

What is claimed is:

1. A dialysis apparatus comprising a stacked array of alternating first and second plates having at least one diaphragm inserted between opposing faces of said plates; each of said first and second plates having a passage system and end portions; each end portion consisting of an inlet hole, a first passage branch and a first opening, a second passage branch and a second opening, at least one third passage branch and a distributing passage including a series of distributors; said first passage branch projecting into said inlet hole and into said first opening, said second passage branch projecting into said first opening and into said second opening, said third passage branch projecting into said second opening and said distributing passages, said distributing passages connecting with said passage system, each end portion additionally having an aperture aligned with an inlet hole on an opposing alternate plate; each of said diaphragms having an aperture aligned with each inlet hole on each opposing plate.

2. A dialysis apparatus as claimed in claim 1 wherein, in each end portion passage, each of said first and second openings comprises an aperture extending transversely through the plate, each of said first and second passage branches comprises a recess on opposite sides of the plate respectively, and wherein each of said third passage branches and each of said distributing passages and each of said passage systems comprises a recess on both sides of said plate; said distributors projecting into both recesses of said distributing passages.

3. A dialysis apparatus as claimed in claim 2 wherein said second opening of said first plate is a flow distribution hole, and wherein said second opening of said second plate is a pressure equalizing hole.

4. A dialysis apparatus as claimed in claim 2 wherein a sealing flange surrounds each of said inlet holes and associated: first and second openings; first, second and third passage branches; distributing passages and passage system.

5. A dialysis apparatus as claimed in claim 4 and further including means for clamping the stacked array of alternating first and second plates and inserted diaphragms and for compressing each sealing flange between its associated plate and adjacent diaphragm.

6. A dialysis apparatus as claimed in claim 4 wherein the sealing flange is provided on one side of each plate.

7. A dialysis apparatus as claimed in claim 1 wherein each plate has at least one guiding heel on the end portion thereof, said heel projecting into a corresponding recess in an adjacent plate to insure alignment of the inlet holes and the associated aperture located opposite each other on opposing plates.

* * * * *